Oct. 15, 1935.   R. BRAUKHOF   2,017,178
CUSHION SEAT COVER
Filed Dec. 26, 1934
Fig. 1.
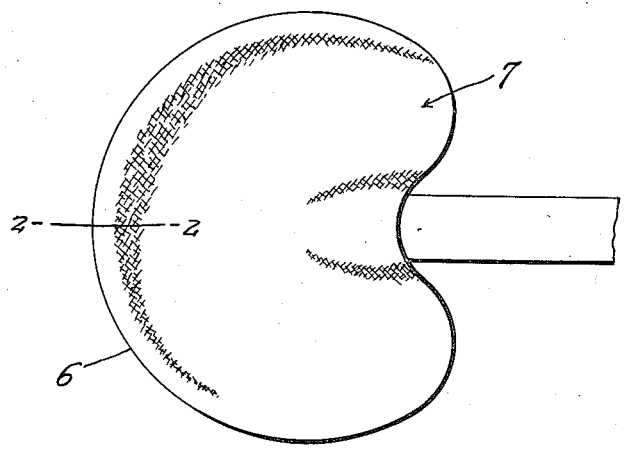
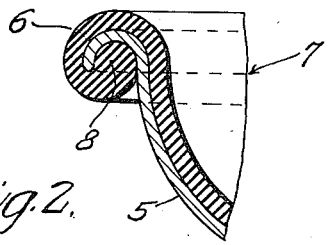
Fig. 2.
Inventor
Robert Braukhof,
By *Clarence A. O'Brien*
Attorney Patented Oct. 15, 1935

2,017,178

UNITED STATES PATENT OFFICE 2,017,178

CUSHION SEAT COVER

Robert Braukhof, Clinton, Wis.

Application December 26, 1934, Serial No. 759,300

1 Claim. (Cl. 155—182)

This invention appertains to new and useful improvements in seats and more particularly to seats for farm implements.

The principal object of the invention is to provide a seat attachment in the form of a cushion pad to promote more comfortable riding for the seat occupant.

During the course of the following specification other important objects and advantages of the invention will become apparent to the reader.

In the drawing:

Figure 1 represents a top plan view of the seat attachment.

Figure 2 represents a sectional view taken substantially on line 2—2 of Figure 1 showing the seat attachment applied to a seat.

Referring to the drawing wherein like numerals designate like parts, it can be seen that numeral 5 represents the conventional type of seat such as is found on various forms of farm implements and tractors and in fact simulates the seat necessarily employed on motor cycles.

This seat 5 in its customary form has an outwardly and downwardly curved edge portion 6 as shown in Figure 2.

The seat cover or pad forming the present invention is generally referred to by the numeral 7 and is preferably constructed of sponge rubber having a waterproof outer surface to prevent penetration of water.

The attachment is constructed so as to fit snugly into the seat 5 and is provided with the rolled edge portion terminating in a relatively large bead 8.

When desired the concaved portion of the attachment is applied to the top of the seat while the rolled edge portion is sprung over the downturned edge portion 6, so that the enlarged bead 8 will engage under this portion 6 of the seat and thus firmly retain the attachment in place.

While the foregoing specification sets forth the invention in specific terms, it is to be understood that numerous changes in the shape, size, materials may be resorted to without departing from the spirit and scope of the invention as claimed hereinafter.

Having described the invention, what is claimed as new is:

An attachment for farm implement seats of the concaved type wherein the edge portion of the seat is disposed downwardly in spaced relation to the side wall of the seat; a resilient pad for disposition over the seat and edge portion thereof, said pad being provided with a beaded edge portion for snug tensional engagement over and between the downward portion and the side wall of the seat.

ROBERT BRAUKHOF.